United States Patent [19]

Meyer

[11] Patent Number: 5,421,773

[45] Date of Patent: Jun. 6, 1995

[54] AUTOMATIC HOCK SHEAR WITH CARCASS LEG POSITIONER

[75] Inventor: Philip G. Meyer, Plainview, Tex.

[73] Assignee: Jarvis Products Corporation, Middletown, Conn.

[21] Appl. No.: 252,176

[22] Filed: Jun. 1, 1994

[51] Int. Cl.6 .................................................. A22C 17/06
[52] U.S. Cl. ................................... 452/167; 452/166; 452/163
[58] Field of Search ................... 452/167, 166, 163, 64; 30/228, 241, 180

[56] References Cited

U.S. PATENT DOCUMENTS

| | | | |
|---|---|---|---|
| 3,405,423 | 10/1968 | Vertegaal | 17/11 |
| 3,488,797 | 1/1970 | Dirks | 17/23 |
| 3,696,464 | 10/1972 | Dillon et al. | 452/167 |
| 3,816,874 | 6/1974 | Jahnke | 452/167 |
| 3,988,803 | 11/1976 | Hamark | 452/163 |
| 3,990,126 | 11/1976 | Ochylski | 17/1 |
| 4,026,028 | 5/1977 | Green | 30/233 |
| 4,098,155 | 7/1978 | Insolio | 83/8 |
| 4,245,372 | 1/1981 | Messner | 452/167 |
| 4,627,167 | 12/1986 | Karubian et al. | 30/228 |
| 4,635,317 | 1/1987 | Van Der Eerden | 452/167 |
| 4,653,147 | 3/1987 | Van Der Eerden | 452/167 |
| 4,841,602 | 6/1989 | Van de Hoorn et al. | 17/23 |
| 5,083,971 | 1/1992 | Karubian et al. | 452/167 |
| 5,180,329 | 1/1993 | Meyer | 452/166 |

FOREIGN PATENT DOCUMENTS

3529205  2/1987  Germany.
2117224 10/1983  United Kingdom.

*Primary Examiner*—Willis Little
*Attorney, Agent, or Firm*—DeLio & Peterson

[57] ABSTRACT

A carcass leg shearing apparatus adapted for mounting near a carcass rail. The apparatus includes a carcass leg engager for engaging the carcass legs and positioning the legs within a shearing region such that the carcass legs are sheared at the hock portions thereof. The leg shearing apparatus further includes a control system connected to position the shearing apparatus at a desired location relative to the carcass, position the carcass legs within the shearing region so that the carcass legs are sheared at the hock portions thereof, move the shearing blade from an open shearing position to a closed shearing position to shear the legs from the carcass, and position the shearing apparatus at a desired location prior to shearing off the legs of the next carcass on the carcass rail.

17 Claims, 5 Drawing Sheets

AUTOMATIC HOCK SHEAR WITH CARCASS LEG POSITIONER

BACKGROUND OF THE INVENTION

1. Field of the Invention

This invention relates to a device for shearing the legs from meat carcasses, and more particularly, to an automatic shear which positions the carcass legs relative to a shearing blade in such a manner that the legs are sheared at the hock thereof.

2. Problem to be Solved

In a meat packing facility, animal carcasses are suspended from their hind legs on hooks carried on trolleys which roll along an overhead carcass rail. The trolleys are continuously driven along the carcass rail to move carcasses through the facility from one processing station to another. One step in the processing requires the removal of the legs from the suspended carcasses. Automated shearing of carcass legs is desirable. However, a perceived problem which has been an impediment to the development of such automated systems is the accuracy required to shear carcass legs at the hock portion thereof. The term "hock", as used herein, is defined to mean the joint bending backward in the legs of cattle, horses, bulls, oxen, etc. Another perceived problem in the industry is the force exerted upon the carcass rail by a stationary shearing apparatus as it attempts to shear off the legs of a moving carcass. The trolley carrying the carcass continues to move as shearing apparatus attempts to shear the carcass legs. Thus, the shearing apparatus prevents the carcass from moving while the trolley continues to pull the carcass away. Such a situation can also cause forces to be exerted on the shearing apparatus. Such force can result in damage to the carcass rail, its drive system and the shearing apparatus resulting in breakdown of these machines. Such breakdowns are detrimental to the productivity of the processing plants and account for high maintenance costs.

It is therefore an object of the present invention to provide a new and improved automated leg shearing apparatus that accurately positions the carcass legs within a shearing region of the apparatus so as to ensure that the legs of the carcass are sheared at the hock thereof.

It is a further object of the present invention to provide a new and improved automated shearing apparatus that reduces the forces applied to it and the carcass rail during the shearing process.

A feature of the present invention is a carcass leg engager which accurately positions the carcass leg within the shearing region to facilitate shearing the carcass legs at the hock.

Another feature of the present invention is a freely moveable frame, that moves substantially parallel to the carcass rail which supports a shearing assembly, such that the frame travels with the moving carcass during the shearing process.

An advantage of the present invention is that the accurate positioning of the carcass legs within the shearing region ensures that the carcass legs are sheared at the hock.

Another advantage of the present invention is that a minimum force is exerted upon the carcass rail, its drive system and the shearing apparatus during the shearing process.

SUMMARY OF THE INVENTION

The above and other objects, which will be apparent to those skilled in the art, are achieved in the present invention which is directed to a carcass leg shearing apparatus which basically comprises a support structure adapted for mounting near a carcass rail, a frame movably mounted to the structure such that the frame freely moves substantially parallel to the carcass rail, a carriage pivotally and slidably mounted on the frame such that the carriage moves vertically with respect to the frame and pivots toward and away from the carcass rail, and a shearing assembly attached to the carriage. The frame is counter-balanced so as to be normally biased to a predetermined position upon the support structure. This predetermined position is referred to as the "home position". The shearing assembly defines a shearing region and includes at least one shearing blade that is moveable in a shearing plane between an open shearing position and a closed shearing position. A carcass leg engager is operatively attached to the carriage for engaging the carcass legs and positioning the legs within the shearing region in a manner such that the legs are sheared at the hock thereof.

Hydraulic cylinder drivers are utilized to move the carriage relative to the frame, position the carcass leg engager relative to the shearing region, and move the shearing assembly from the open shearing position to the closed shearing position to shear the carcass legs at the hocks thereof. After the legs are sheared from the carcass, the shearing assembly and carcass leg engager are sterilized and the frame returns to the home position.

The leg shearing apparatus further includes a control system connected to control the carriage drivers so as to position the carriage at a desired location relative to the carcass, position the carcass legs within the shearing region so that the carcass legs are sheared at the hocks and move the shearing blade from an open shearing position to a closed shearing position to shear the legs from the carcass. The leg shearing apparatus further includes a detector network connected to the control system and detects the height of the carcass on the carcass rail with respect to the floor, and the position of the carriage upon the frame. In response to the signals from the detector network, the control system raises or lowers the carriage to the height necessary to shear the legs of the approaching carcass, and returns the carriage to an initial position prior to shearing the legs off the next carcass.

DESCRIPTION OF THE PREFERRED EMBODIMENTS

Figure 1:
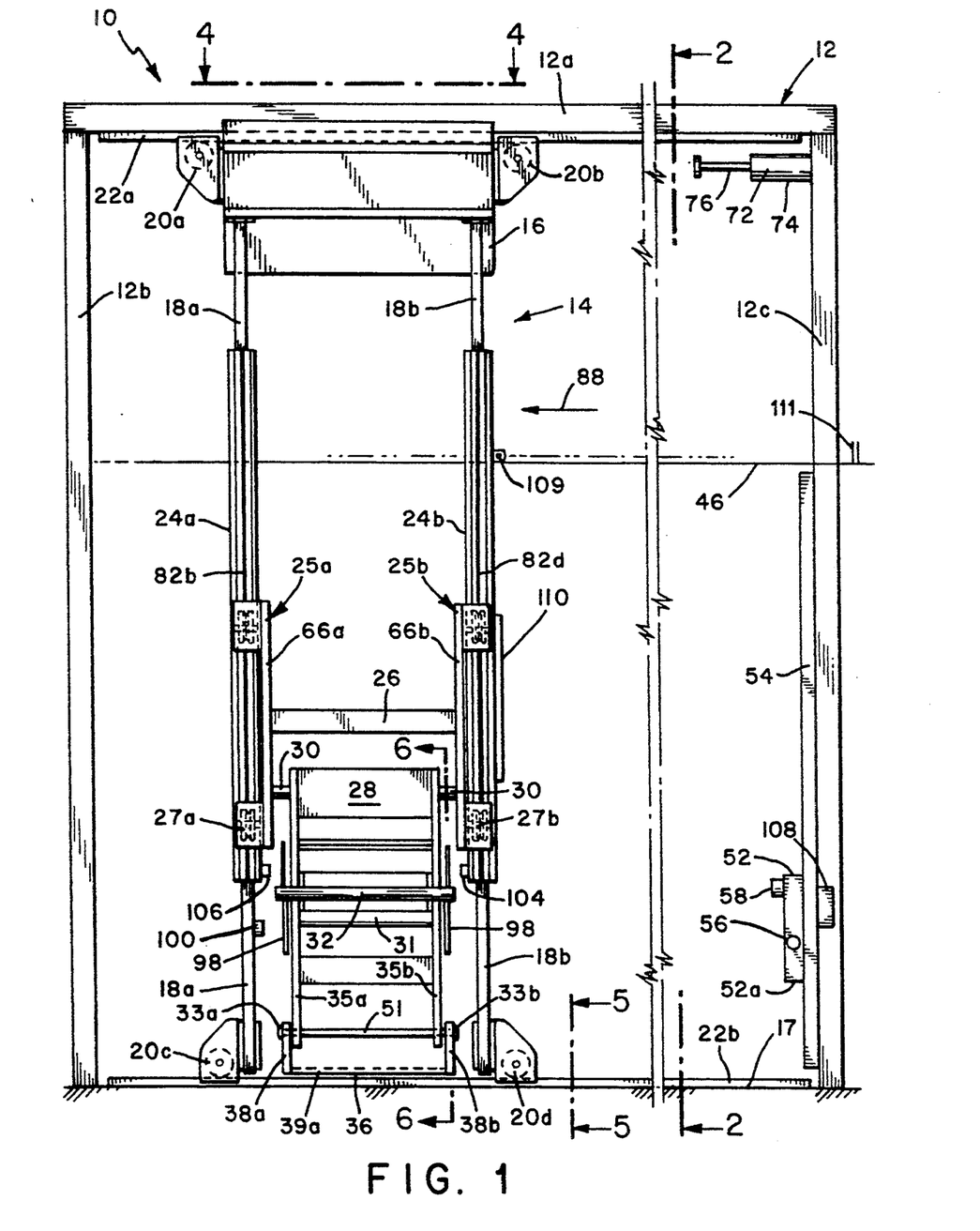
FIG. 1 is a front elevational view of the apparatus of the present invention.
Figure 2:
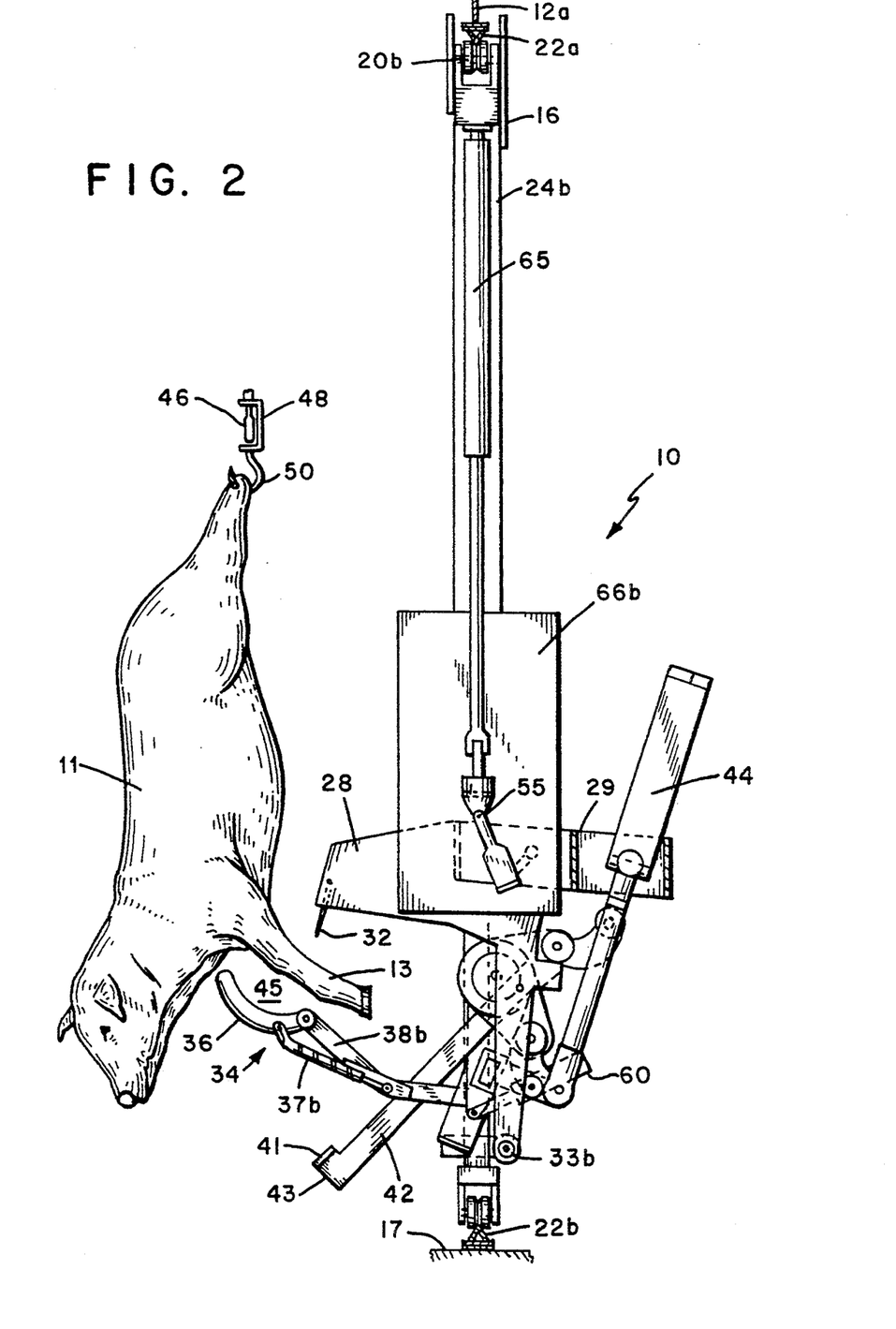
FIG. 2 is a side elevational view taken along lines 2—2 of FIG. 1 and shows an approaching carcass in proximity to the apparatus of the present invention.
Figure 6:
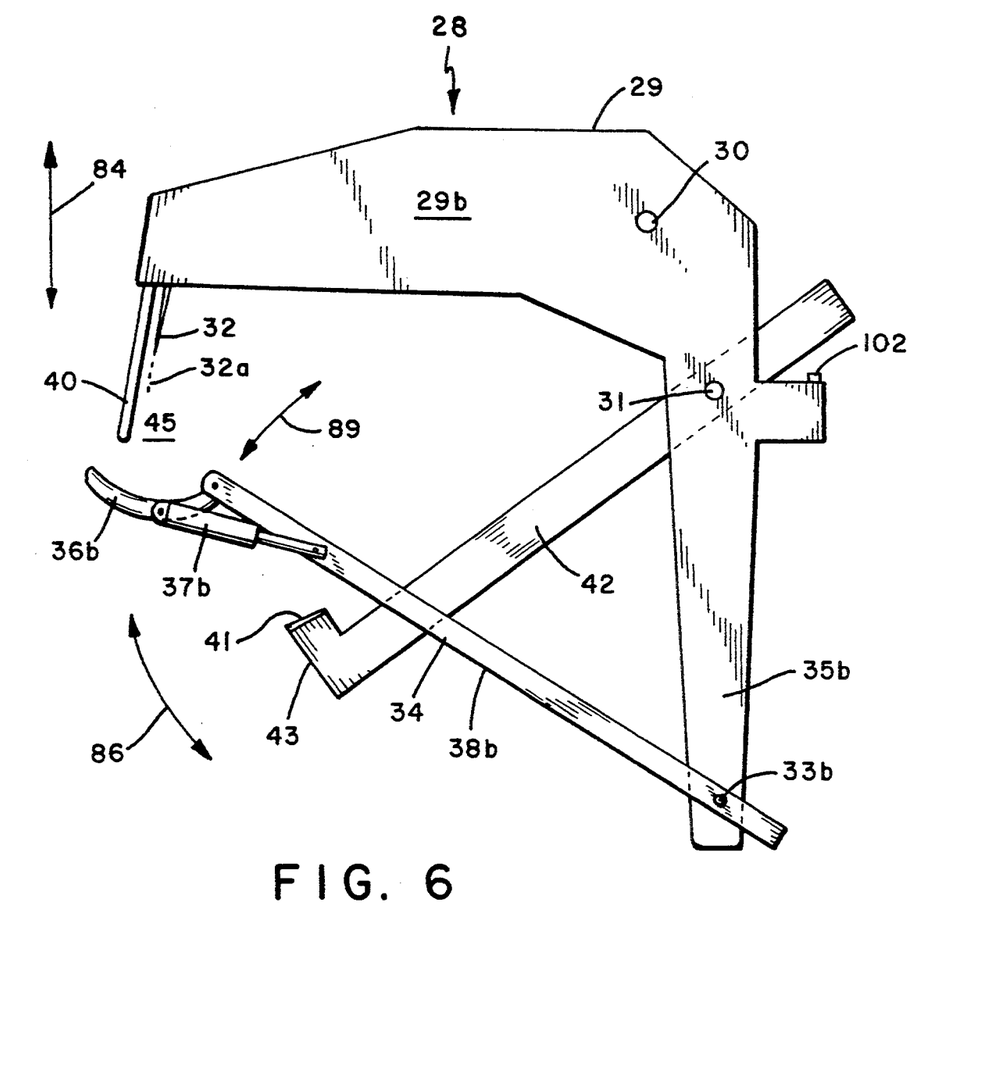
FIG. 6 is a side elevational view taken along line 6—6 of FIG. 1.

Referring to FIGS. 1, 2 and 6, the assembled basic components of the automatic leg shearing apparatus 10 comprises generally support structure 12, frame assembly 14, carriage assembly 28 and carcass leg engager 34 (see FIG. 2). Support structure 12 comprises horizontal member 12a which is attached to vertical members 12b and 12c. Members 12a and 12b are fixed to floor 17. Track 22a is attached to the underside of member 12a and track 22b is fixed to floor 17. Support plate 16 is attached to the upper ends of elongated frame members 18a, 18b and to rollers 20a, 20b. Similarly, the bottom ends of elongated frame members 18a, 18b are attached to rollers 20c and 20d, respectively. Rollers 20a, 20b and 20c, 20d are rollably engaged with track 22a and 22b, respectively.

Figure 5:
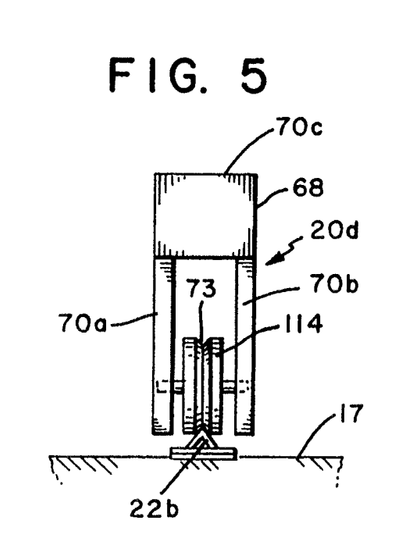
FIG. 5 is an enlarged side elevational view taken along line 5—5 of FIG. 1.

FIG. 5 shows the construction of roller assembly 20d. However, FIG. 5 is also illustrative of roller assemblies 20a, 20b and 20c. Housing 68 comprises top 70c and extending plates 70a, 70b which are attached to top 70c. Wheel 114 is rotatably mounted between plate 70a and 70b and has circumferentially formed groove 73. Groove 73 receives the apex of track 22b which is mounted on floor 17. Thus, frame 14 is able to move in a motion that is substantially parallel to carcass rail 46. Frame 14 is counterbalanced so as to be normally biased to the right hand side of structure 12 which will be referred to herein as the "home position". However, frame 14 can be counter-balanced to any portion of structure 12. A factor in determining to what position frame 14 should be biased is the location of the approaching carcasses. In the embodiment shown in FIG. 1, the carcasses approach from the right hand side of structure 12. Damper 74 comprises cylinder 72 having spring biased piston 76 disposed therein. Damper 74 absorbs the force of frame 14 as it moves to the right hand side of structure 12. Frame 14 is positioned at the "home" position when roller 20b contacts piston 76 without compressing piston 76.

Figure 4:
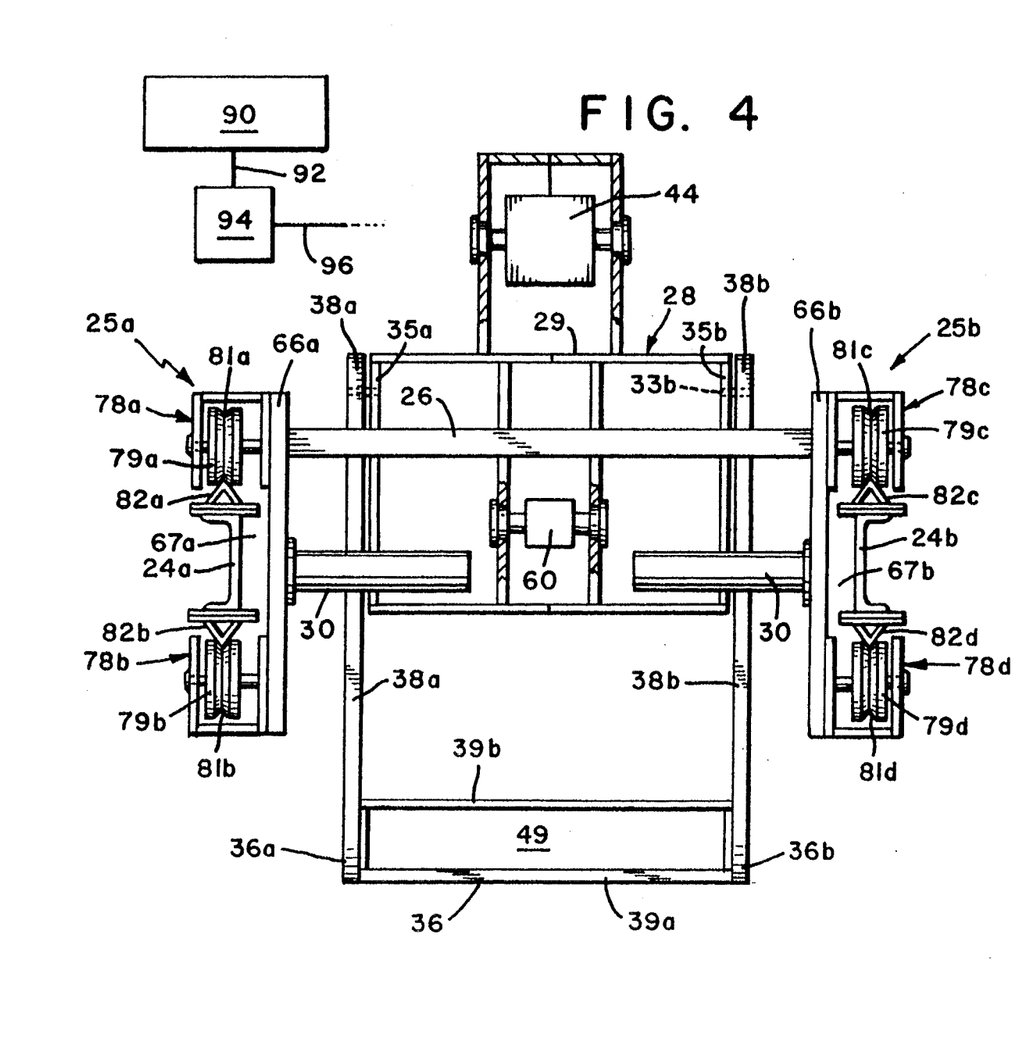
FIG. 4 is a top plan view taken along line 4—4 of FIG. 1.

Retractable interlock pin 109 is attached to member 24b and is controlled by an electrically activated solenoid (not shown) which is responsive to control system 90 (see FIG. 4). When pin 109 is protruding from its socket, it engages a chain (not shown) which is part of carcass rail 46. The chain pulls frame 14 such that frame 14 rolls along tracks 22a, 22b and in the direction of the travelling carcass, which is indicated by arrow 88 in FIG. 1. This feature minimizes the forces that are exerted on the carcass rail and the shearing apparatus while the carcass legs are being sheared off the carcass. After the carcass legs are sheared, pin 109 is retracted so as to disengage it from the carcass rail chain. Once pin 109 becomes disengaged from the chain, frame 14 rolls back to the home position.

Elongated members 24a and 24b are attached to elongated frame members 18a and 18b, respectively. Support member 26 is attached intermediate plates 66a and 66b. Member 30 is attached between plates 66a and 66b and provides a pivot point upon which carriage 28 pivots as indicated by arrow 86 in FIG. 6. Each end of plate 66a is attached to a corresponding one of roller assemblies 25a and 27a, respectively. Similarly, each end of plate 66b is attached to a corresponding one of roller assemblies 25b and 27b, respectively. Since assemblies 25a, 25b and 27a, 27b are identically constructed, only assemblies 25a, 27b will be described below.

Referring to FIG. 4, assembly 25a comprises roller sub-assemblies 78a and 78b. Sub-assemblies 78a and 78b include wheels 79a and 79b, respectively. Wheels 79a and 79b have circumferentially formed grooves 81a and 81b, respectively. Groove 81a and 81b receive the apices of tracks 82a and 82b, respectively, which are mounted on opposite sides of members 24a. Similarly, roller assembly 25b comprises roller sub-assemblies 78c and 78d. Sub-assemblies 78c and 78d include wheels 79c and 79d, respectively. Wheels 79c and 79d have circumferentially formed grooves 81c and 81d, respectively. Grooves 81c and 81d receive the apices of tracks 82c and 82d, respectively, which are mounted on opposite sides of member 24b. Thus, plates 66a, 66b are able to move vertically upon elongated members 24a and 24b. Since plates 66a, 66b are attached to member 26, and carriage 28 is pivotally attached intermediate plates 66a, 66b, carriage 28 moves vertically with plates 66a, 66b.

Figure 3:
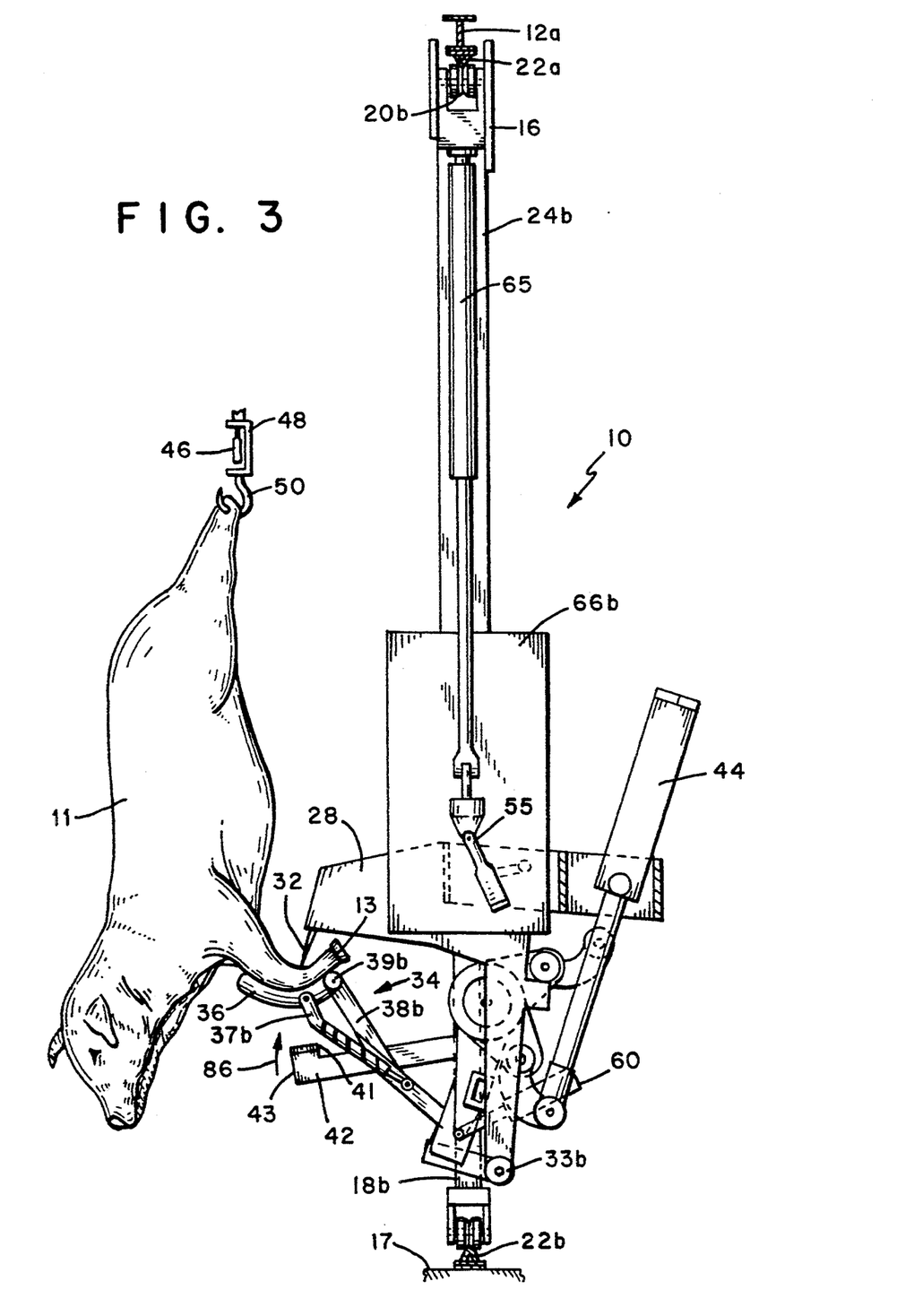
FIG. 3 is a side elevational view similar to that of FIG. 2 and shows the position of carcass legs positioned within a shearing region of the present invention.

Referring to FIG. 2, driver 65 is attached to carriage 28 via clevis bracket and pin assembly 55 so as to vertically move carriage 28 as indicated by arrow 84 of FIG. 6. Driver 65 consists of a pair of identically constructed drivers, one positioned on each side of carriage 28. Each of the drivers comprises a linear hydraulic cylinder driver. Both drivers are identically constructed and function in the same manner. However, only one of the driver pair is shown in FIGS. 2 and 3. In a preferred embodiment, driver 65 is connected between plate 16 and carriage 28 as shown in FIGS. 2 and 3. Referring to FIG. 4, one of the drivers of driver pair 65 is positioned within space 67a, which is located between plate 66a and member 24a. Similarly, the other driver of driver pair is positioned within space 67b, which is between plate 66b and member 24b.

As shown in FIG. 1, carriage 28 is pivotally attached between and to plates 66a, 66b at pivot point 30. Referring to FIG. 6, carriage 28 is shown without structure 12, frame 14, members 24a, 24b or support plates 66a, 66b in order to facilitate understanding of carriage 28 and the associated components attached thereto. Carriage 28 comprises body 29, downwardly extending side portions 35a, 35b, shearing blade 32 and pressure arm 42. Carriage 28 is able to pivot in the direction indicated by arrow 86. Carriage 28 is pivoted by a driver (not shown) which comprises a linear hydraulic cylinder driver. Shearing blade 32 is fixed to carriage 28 and extends downwardly into shearing region 45. Movable pressure arm 42 has shearing blade or cutting head 41 fixed to end 43. Shearing blades 32 and 41 define a shearing plane represented by dotted line 32a. During the shearing action, blades 32 and 41 pass along each other with a minimal amount of clearance. Arm 42 is pivotally mounted to body 29 and pivots about member point 31 which defines a pivot point. Thus, arm 42 pivots in the direction indicated by arrow 86. Arm 42 is driven by driver 44 (see FIG. 5) which is mounted to the rear portion of body 29 and comprises a linear hydraulic cylinder driver.

Referring to FIG. 6, retainer 40 consist of an elongated member attached to upper side portion 29b of body portion 29. Retainer 40 prevents the carcass legs from swinging free of shearing region 45. In an alternate embodiment, retainer may be movably mounted to allow carcass legs 13 to pass through shearing region 45 in the event shearing apparatus 10 is inoperative. For instance, a spring arrangement might be used to bias retainer 40 in a downward position, as shown in FIG. 6. If the shearing apparatus 10 is inoperative, the force of the carcass legs 13 against retainer 40 will cause retainer 40 to move parallel to rail 46 so as to allow the carcass to pass through shearing region 45.

Referring to FIGS. 4 and 6, carcass leg engager 34 is pivotally attached to side portions 35a, 35b at pivot points 33a, 33b, respectively, such that engager 34 can pivot in the direction indicated by arrow 89. Engager 34 is driven by driver 60 which comprises a linear hydraulic cylinder driver and is mounted to body portion 29. Referring to FIGS. 1 and 6, engager 34 comprises outwardly extending arms 38a, 38b and carcass leg holder 36. Arms 38a, 38b are attached to support member 51 which is pivotally mounted between pivot points 33a, 33b. Carcass leg holder 36 comprises a rectangular frame consisting of curved members 36a, 36b and elongated members 39a, 39b. Each member 39a, 39b is attached intermediate curved members 36a, 36b as shown in FIG. 4. Curved members 36a, 36b are pivotally attached to the ends of arm 38a, 38b, respectively, and pivot about a pivot point defined by member 39b. Brackets 37a, 37b are mounted between member 36a and arm 38a, and member 36b and arm 38b, respectively. Referring to FIGS. 4 and 6, members 39a, 39b and 36a, 36b define opening or space 49. Opening 49 receives blade 41 of arm 42 when arm 42 moves upward toward shearing blade 32. When arms 38a, 38b are raised upward to engage the carcass legs, the carcass legs lie across members 39a, 39b in a manner such that the hock or joints of the carcass legs 13 contact blade 32 and are positioned over opening 49. When arm 42 is activated, it moves upward such that blade 41 on end 43 of arm 42 protrudes through opening 49 and presses carcass legs 13 against blade 32 so as to shear the legs at the hock.

The shearing apparatus of the present invention utilizes control system 90 which comprises programmable logic circuitry. Control system 90 is electrically connected to electrically activated hydraulic valve network 94 via cable 92. Control system 90 is responsive to detector network 52, safety sensor 111 and proximity or limit switches 100, 102, 104 and 106. Proximity switch 100 is mounted to member 18a. However, switch 100 can also be mounted to member 18b. Switch 100 is activated when carcass leg engager 34 is raised to a maximum height. When activated, switch 100 sends a signal to control system 90. In response, control system 90 sends a signal to network 94 which then activates driver 44 so as to move arm 42 upward so that blade 41 will protrude through opening 49 in order to contact carcass legs 13. Proximity switch 102 is mounted to the rear portion of carriage 29. Switch 102 is activated when pressure arm 42 is raised to its maximum height. When activated, switch 102 sends a signal to control system 90. In response, control system 90 sends a signal to valve network 92 which decreases the flow of hydraulic fluid to drivers 44 and 60 so as to lower pressure arm 42 and carcass engager 34, respectively. Proximity switch 104 is mounted to frame 24b and is activated when driver 65 drivers carriage 28 downward to a predetermined position which indicates carriage overtravel. When activated, switch 104 sends a signal to control system 90. In response, control system 90 sends a signal to valve network 92 to decrease the flow of hydraulic fluid to driver 65 so as to stop the downward movement of carriage 28. Proximity switch 106 is also mounted to frame 24a and is activated when carriage 28 is pivoted outward toward carcass rail 46 to a predetermined location. When activated, switch 106 sends a signal to control system 90. In response, control system 90 sends a signal to a driver (not shown) which retracts carriage 28.

A safety sensor 111 is located on carcass rail 46 some distance from support structure 12 and to the right of member 12c (see FIG. 1). Safety sensor 111 is connected to control system 90 for producing a signal indicating the presence of a carcass on carcass rail 46. The safety sensor is activated when it is contacted by trolley 48. Pressure arm 42 will move upward to shear a carcass leg only when control system 90 detects a signal from the safety sensor. Thus, the safety sensor ensures that pressure arm 42 will move upward only if a carcass is present on rail 46 adjacent apparatus 10. This safety feature prevents injury to personnel who are operating shearing apparatus 10.

Network 52 is slidably mounted upon post 54, which is attached to member 12c, and comprises detectors 56 and 58 which are mounted on chassis 52a. Network 52 is vertically driven by an hydraulic motor 108 which is responsive to signals sent by control system 90. Detector 56 is a diffuse-type photo detector and is aimed at the oncoming carcasses travelling on carcass rail 46. Detector 58 is a retro-reflective type photo detector and is responsive to reflective strip 110 attached to member 24b. Network 52 initially is positioned adjacent floor 17 and moves upward, via motor 108, along post 54 until detector 56 locates the bottom portion or legs of carcass 11. When detector 56 locates carcass 11, it outputs a signal to control system 90. In response, control system 90 deactivates hydraulic motor 108 to stop the upward movement of network 52, and also sends a signal to detector 58 to enable detector 58 to scan for any reflections from strip 110. If detector 58 initially receives a reflection from strip 110, control system 90 will move carriage 28, via driver 65, upward until detector 58 no longer receives any reflections from strip 110. However, if detector 58 initially does not receive any reflections from strip 110, control system 90 will move carriage 28, via driver 65, downward until detector 58 receives a reflection. Detector 58 is mounted on chassis 52a above detector 56 so as to take into consideration the height of track 22b and the operational space required by carcass leg engager 34. After the legs are sheared from the carcass, motor 108 moves network 52 downward to its initial position and frame 14 rolls back to the home position. When frame 14 is in the home position, detector 58 again searches for reflections from strip 110. If detector 58 receives reflections, control system 90 will move carriage 28 upward until detector 58 no longer receives reflections. However, if detector 58 does not receive a reflection, control system 90 will move carriage 28 downward until detector 58 receives a reflection. The length of reflective strip 110 generally determines the range in which carriage 28 can move vertically upon members 24a, 24b. The length of strip 110 generally depends upon the size of the carcasses on which the shearing apparatus is to operate.

Sterilization fluid distributor 98 comprises a manifold attached to the sides of carriage 28. The manifold is tapped to receive a plurality of nozzles. The distributor 98 is fluidly connected to an electrically activated valve (not shown) which is fluidly connected to a sterilization fluid source (not shown). The electrically activated valve is controlled by signals produced from control system 90. After the carcass legs 13 are sheared off the carcass, control system 90 sends a signal to the electrically activated valve so as to allow sterilization fluid to flow to distributor 98 in order to sterilize the components of shearing apparatus 10.

Once trolley 48 activates safety sensor 111, control system 90 initiates a carcass interlock process which involves a series of steps basically comprising locating the approaching carcass, adjusting the vertical position of carriage 28 relative to the carcass legs, shearing the carcass legs at the hock thereof, sterilizing shearing blades 32, 41 and carcass engager 34 and vertically adjusting carriage 28 to its initial position. Once the legs are sheared from the carcass, the interlock process ends and is not initiated again until sensor 111 is activated. The interlock process will now be described in detail.

Theory of Operation

Referring to FIGS. 1 and 2, each carcass 11 is attached to a corresponding carcass hook 50. Each hook 50 is attached to a corresponding hook support bracket or trolley 48 which is slidably mounted to carcass rail 46. The carcasses move along rail 46 in a direction indicated by arrow 88. When trolley 48 contacts the safety sensor 111, safety sensor 111 outputs a signal to control system 90. In response, control system 90 initiates the interlock process. When the interlock process begins, frame 14 is located at its home position and carriage 28 is in its initial vertical position. If control system 90 initially receives a signal from detector 56 indicating that detector 56 does not detect the carcass, control system 90 outputs a signal to cause motor 108 to move network 52 upward until detector 56 detects the bottom portion or the legs of the carcass. Once detector 56 detects the carcass, control system 90 will then produce a signal that deactivates motor 108 so as to stop the upward movement of network 52. The control system 90 then begins monitoring signals from detector 58. However, if control system 90 initially receives a signal from detector 56 indicating that detector 56 has detected a carcass, control system 90 will control motor 108 to move network 52 downward until detector 58 no longer detects the carcass. Once detector 56 no longer detects the carcass, control system 90 outputs a signal to deactivate motor 108 in order to stop the downward movement of network 52. The control system will then begin monitoring signals from detector 58.

If control system 90 initially receives a signal from detector 58 indicating that detector 58 is receiving reflections from strip 110, control system 90 will control driver 65 to move carriage 28 upward until detector 58 no longer receives reflections from strip 110. Once detector 58 no longer receives reflections, control system 90 will halt the upward movement of carriage 28. The position at which carriage 28 comes to a halt is the carriage height required for shearing the legs off the particular carcass approaching shearing apparatus 10. However, if control system 90 initially receives a signal from detector 58 indicating that detector 58 is not receiving reflections from strip 110, control system 90 will control driver 65 so as to move carriage 28 downward until detector 58 begins receiving reflections from strip 110. Once detector 58 begins receiving reflections from strip 110, control system 90 will halt the downward movement of carriage 28. The position at which carriage 28 comes to a halt is the carriage height required for shearing the legs off the particular carcass that is approaching shearing apparatus 10.

Once carriage 28 is at the desired height, control system 90 extends pin 109 from its socket so as to enable pin 109 to become engaged with the carcass rail chain.

When pin 109 becomes engaged with the carcass rail chain, frame 14 moves along with the moving carcass. As shown in FIG. 2, carcass legs 13 pass into shearing region 45. After an interval of time elapses from the beginning of the interlock process, control system 90 activates driver 60 to move carcass engager 34 upward so as to press carcass legs 13 against blade 32 such that carcass leg holders 36 cause legs 13 to bend around blade 32. When engager 34 moves upward to its maximum height, proximity switch 100 is activated and sends a signal to control system 90. In response, control system 90 activates driver 44 so as to raise pressure arm 42. Pressure arm 42 is raised upward such that blade 41 passes through opening 49 (see FIG. 4) and presses carcass legs 13 against fixed blade 32 such that the carcass legs are sheared at the hock or joint. When pressure arm 42 moves upward to its maximum height (which is the height necessary to shear the carcass legs), the pressure arm proximity switch network 102 sends a signal to control system 90. In response, control system 90 sends a signal to driver 65 so as to momentarily dip or move carriage 28 downward so as to increase the driving force of blade 32 into the hock or joints of the carcass legs. The momentary downward movement allows the carcass chain to pull the carcass away in order to completely sever all the tendons within the carcass leg. Control system 90 then activates drivers 44 and 60 so as to lower pressure arm 42 and engager 34, respectively, to their initial positions, activates valve network 94 to allow sterilization fluid to exit distributor 98 so as to sterilize blade 32, pressure arm 42 and engager 34, and deactivates pin 109 so as to allow frame 14 to roll back to the home position. Once frame 14 is in the home position, control system 90 and detector 58 cooperate, as explained above, to position carriage 28 in its initial position. Sterilization does not occur until the carcass is a sufficient distance from apparatus 10. In a preferred embodiment, the sterilization fluid is water which has a temperature of 180° F.

If switch 100 is not activated after a predetermined amount of time has elapsed after the start of the interlock process, control system 90 will pivot carriage 28 toward rail 46 so as to allow carcass legs 13 to lie across members 39a, 39b.

For clarity in the drawings, the hydraulic hoses and valves are not shown. The interconnection of these components to their respective drivers is conventional. Although all drivers described above comprise a linear hydraulic cylinder driver, other types of linear driver mechanisms, such as pneumatic drivers, mechanical screw mechanisms or geared drivers might also be used. Electrical wiring connecting the control system 90 to the sensors and detectors is also not shown for purposes of clarity in the drawings. Interconnection of these components is also conventional. For the same reasons, sterilization fluid hoses and valves are not shown.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. An automatic carcass leg shearing apparatus comprising:
   a support structure adapted for mounting near a carcass rail;
   a frame movably engaged with said structure such that said frame freely slides substantially parallel to the carcass rail, said frame being normally biased to a predetermined location relative to said support structure;
   a carriage pivotally and slidably mounted on said frame such that said carriage moves vertically with respect to said frame and pivots toward and away from the carcass rail;
   a carriage driver for moving said carriage relative to said frame;
   a shearing assembly attached to said carriage, said shearing assembly including at least one shearing blade movable in a shearing plane between an opened and a closed shearing position, said shearing assembly defining a shearing region;
   a carcass leg engager operatively attached to said carriage for engaging the carcass legs and positioning the legs within said shearing region such that the hock of the carcass legs is within said shearing plane;
   a carcass leg engager driver for positioning said engager relative to said shearing region; and
   a shearing blade driver for moving the shearing assembly from the open shearing position to the closed shearing position to shear the carcass legs at the hock thereof.

2. The apparatus of claim 1 wherein said shearing assembly comprises:
   a shearing blade fixed to said carriage; and
   a pressure arm pivotally attached to said carriage, said pressure arm having a cutting head at the end of said pressure arm opposite the end of said pressure end pivotally attached to said carriage, said pressure arm being pivoted in an upward and downward motion by said shearing blade driver.

3. The apparatus of claim 2 wherein said carcass leg engager comprises:
   a pair of arms extending outward from and pivotally attached to said carriage, said arms pivoting in an upward and downward motion; and
   a carcass leg holder comprising:
      a substantially rectangular frame pivotally attached intermediate the ends of said outwardly extending arms, said frame defining an opening therein for receiving said fixed shearing blade and said cutting head of said pressure arm, said carcass leg holder engaging said carcass legs in a manner such that the hock portions of the carcass legs are positioned over said opening in said frame.

4. The apparatus of claim 1 further including a control system connected to control said carriage driver, said engager driver and said shearing blade driver to position said carriage at a desired location, position the carcass legs within said shearing region, and move said shearing blade from an open shearing position to a closed shearing position to shear the legs from the carcass.

5. The apparatus of claim 4 further including a detector network connected to said control system, said network comprising a carriage detector producing a signal indicating the location of said carriage, and a carcass detector producing a signal indicating an approaching carcass on the carcass rail.

6. The apparatus of claim 5 wherein said detector network is adapted to move vertically so as allow said carriage detector and said carcass detector to locate said carriage and the carcass, respectively.

7. The apparatus of claim 5 further including a safety sensor connected to said control system for producing a signal indicating the presence of a carcass on the carcass rail, said control system moving said shearing assembly from an open shearing position to a closed shearing position only upon detection of a signal from said safety sensor.

8. The apparatus of claim 1 further including a retainer for preventing the carcass legs from swinging free of said shearing region.

9. The apparatus of claim 8 wherein said retainer is adapted to allow the carcass legs to pass through said shearing region if said shearing apparatus is inoperative.

10. The apparatus of claim 2 further including a sterilization fluid distributor mounted to said carriage and responsive to said control system, said distributor sterilizing said shearing assembly and said engager after shearing the legs from a carcass.

11. The apparatus of claim 6 further including a reflective material mounted to said carriage, said carriage detector producing signals indicating the detection or non-detection of said reflective material.

12. The apparatus of claim 1 wherein during the shearing process, said carriage driver drives said carriage downward in order to break any partially severed tendons in the carcass legs.

13. The apparatus of claim 1 further including a second carriage driver for pivoting said carriage with respect to said frame so as to facilitate positioning the carcass legs within said shearing region.

14. The apparatus of claim 4 further including a carcass rail engager connected to said control system for removably connecting said frame with the carcass rail so as to allow said frame to move with the moving carcass on the carcass rail.

15. An automatic carcass leg shearing device comprising:
   a support structure adapted for mounting near a carcass rail;
   a frame movably engaged with said structure such that said frame freely slides substantially parallel to the carcass rail, said frame being normally biased to a predetermined location relative to said support structure;
   a carriage pivotally and slidably mounted on said frame such that said carriage moves vertically with respect to said frame and pivots toward and away from the carcass rail;
   a carriage driver for moving said carriage relative to said frame;
   a shearing assembly attached to said carriage, said shearing assembly including at least one shearing blade movable in a shearing plane between an opened and a closed shearing position, said shearing assembly defining a shearing region;
   a retainer for preventing the carcass legs from swinging free of said shearing region;
   a carcass leg engager operatively attached to said carriage for engaging the carcass legs and positioning the legs within said shearing region;

a carcass leg engager driver for positioning said engager relative to said shearing region;

a shearing blade driver for moving the shearing assembly from the open shearing position to the closed shearing position to shear the carcass legs at the joints thereof;

a detector network producing signals indicating the location of said carriage and approaching carcasses on the carcass rail;

a control system connected to said detector network to control said carriage driver, said engager driver and said shearing blade driver to position said carriage at a desired location, position the carcass legs within said shearing region, and move said shearing blade from an open shearing position to a closed shearing position to shear the legs from the carcass;

a carcass rail engager connected to said control system for removably connecting said frame with the carcass rail so as to allow said frame to move with the moving carcass on the carcass rail; and a sterilization fluid distributor mounted to said carriage and responsive to said control system for sterilizing said shearing assembly and said engager after shearing the legs from a carcass.

16. The apparatus of claim 15 wherein said shearing assembly comprises:

a shearing blade fixed to said carriage; and a pressure arm pivotally attached to said carriage, said pressure arm having a cutting head at the end of said pressure arm opposite the end of said pressure end pivotally attached to said carriage, said pressure arm being pivoted in an upward and downward motion by said shearing blade driver.

17. The apparatus of claim 16 wherein said carcass leg engager comprises:

a pair of arms extending outward from and pivotally attached to said carriage, said arms pivoting in an upward and downward motion; and a substantially rectangular frame pivotally attached intermediate the ends of said outwardly extending arms, said frame defining an opening therein for receiving said fixed shearing blade and said cutting head of said pressure arm, said carcass leg holder engaging said carcass legs in a manner such that the hock portions of the carcass legs are positioned over said opening in said frame.

* * * * *